Jan. 23, 1951    H. SKIBBE ET AL    2,538,886
SPREADER FOR SEED AND FERTILIZER
Filed July 30, 1948    2 Sheets-Sheet 1

INVENTORS.
Henry Skibbe
Harold A. Skibbe
BY
ATTORNEY.

Jan. 23, 1951  H. SKIBBE ET AL  2,538,886
SPREADER FOR SEED AND FERTILIZER
Filed July 30, 1948  2 Sheets-Sheet 2
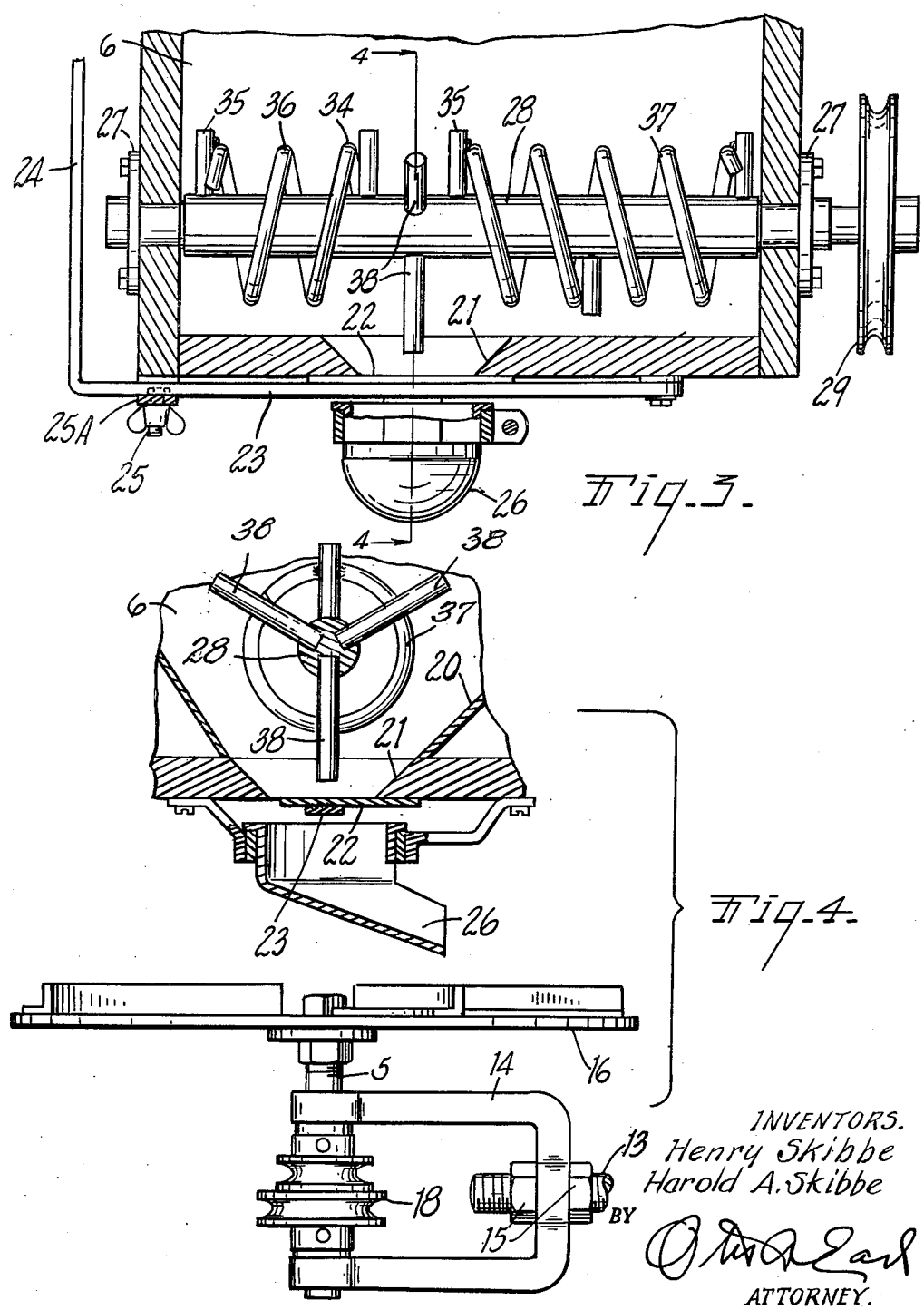
INVENTORS.
Henry Skibbe
Harold A. Skibbe
BY
ATTORNEY.

Patented Jan. 23, 1951

2,538,886

UNITED STATES PATENT OFFICE 2,538,886

SPREADER FOR SEED AND FERTILIZER

Henry Skibbe and Harold A. Skibbe, Eau Claire, Mich.

Application July 30, 1948, Serial No. 41,468

6 Claims. (Cl. 275—8)

This invention relates to improvements in spreaders for seed and fertilizer.

The principal objects of this invention are:

First, to provide a novel form of divided hopper and auger for delivering seed or fertilizer or a mixture of the two to a pair of distributor disks mounted on the rear of a vehicle.

Second, to provide a novel form of agitating and feeding mechanism which will assure a regular and constant flow of material in a hopper to the spout of the hopper and which will break up any clods which tend to clog the hopper spout.

Third, to provide a hopper for a seed or fertilizer spreader in which a pair of spiral agitators are conveniently belt driven from the driving shaft of the spreader to constantly move material in the hopper toward the outlet spout from both sides of the outlet spout.

Fourth, to provide improved mechanism for tiltably mounting two rotatable distributor disks underneath the discharge spouts of a divided hopper.

Other objects and advantages pertaining to the details of the invention will be apparent from a consideration of the following description and claims.

The drawings, of which there are two sheets, illustrate a preferred form of the spreader mounted on a farm tractor.

Fig. 3 is a longitudinal cross sectional view taken along the axis of one of the feed augers as indicated by the line 3—3 in Fig. 2.

Fig. 4 is a fragmentary transverse cross sectional view taken along the plane indicated by the line 4—4 in Fig. 3 and illustrating the relative positions of the hopper, feed auger and distributor disk.

Figure 1:
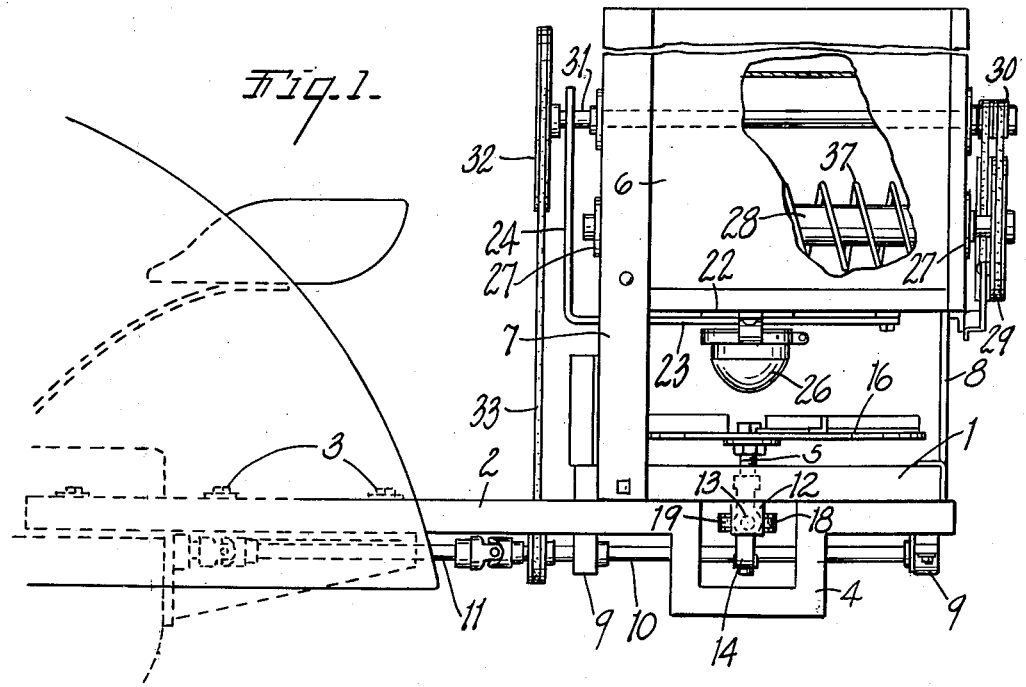
Fig. 1 is a side elevational view of the spreader mounted on a tractor, the hopper being partially broken away to illustrate the location of the feed auger.
Figure 2:
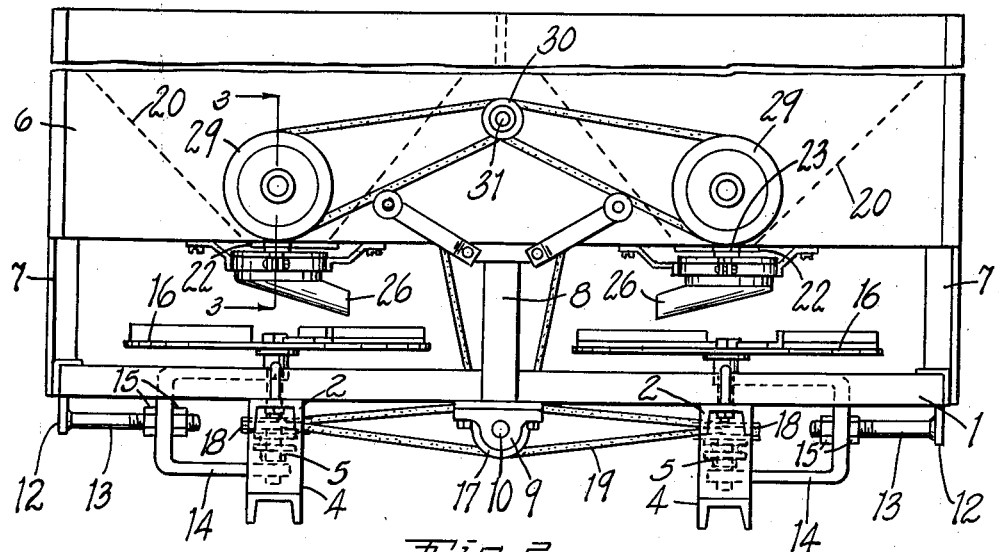
Fig. 2 is a fragmentary rear elevational view of the lower portion of the hopper and the distributor mechanism.

The spreader illustrated in the drawings is an improved form of the spreader illustrated in our co-pending application of Henry Skibbe and Harold A. Skibbe, for Seed and Fertilizer Spreader, Serial No. 665,750, filed April 29, 1946. This improved form of spreader consists of a generally rectangular supporting frame 1 which is secured upon a pair of longitudinally extending connecting beams 2. The beams 2 are removably securable to the frame of a farm tractor as by the bolts 3 and are provided toward their rear ends with downwardly extending U-shaped portions 4 adapted to receive the lower ends of the tiltable distributor shafts 5. The hopper 6 consists of a generally rectangular box supported over the shafts 5 by a pair of corner angle members 7 and a center strut 8 secured to the back of the supporting frame 1.

Secured to the under side of the frame 1 and aligned generally with the center of the tractor are a pair of bearings 9 which rotatably support the drive shaft 10 for rotating the distributor shafts and the feed augers in the hopper. The forward end of the drive shaft 10 is connected to the power take-off shaft of the tractor by a propeller shaft 11 having universal joint couplings with the take-off shaft and the drive shaft.

Secured to the side pieces of the supporting frame 1 and transversely aligned with the U-shaped portions 4 in the supporting beams are a pair of plates 12 having the threaded bolts 13 welded thereto and projecting laterally inwardly from the sides of the frame. Each of the bolts 13 supports a U-shaped bracket 14 which is rotatably adjustable on its supporting bolt to lie at different angles relative to the supporting frame 1. The U-shaped brackets are clamped in place by the nuts 15. The spaced arms of the brackets 14 form supporting bearings for the distributor shafts 5 so that the shafts can be tilted in longitudinal planes forwardly and rearwardly with respect to the supporting frame 1. The top of each distributor shaft 5 carries a circular distributor disk 16 which is rotatable with its shaft underneath the hopper 6.

The drive shaft 10 is provided with a set of stepped pulleys 17 which are selectively connectable with pulleys 18 on the distributor shafts by the belts 19. Note that adjustment of the nuts 15 will effect adjustment of the tension of the belts 19 as well as acting to clamp the brackets and distributor shafts in their angularly adjusted positions.

The hopper 6 which is supported over the distributor disks 16 is divided interiorly by partition walls 20. The transversely sloping portions of the partition walls at the bottom of the partition form funnel-like bottoms opening through the apertures 21 approximately over the center of the distributor disks 16. The partitions 20 divide the hopper 6 into two separate compartments so that either seed or fertilizer or a mixure of the two can be distributed from the spreader. Each of the discharge openings 21 is provided with a plate-like regulating valve 22 adjustably mounted on a valve arm 23. The valve arms 23 extend forwardly to operating handles 24 conveniently located behind the operator's seat of the tractor and stop bolts 25 are provided on the valve arm and hangers 25A for adjustably limiting the size of the valve openings. Rotatably mounted beneath each of the openings 21 is a discharge spout 26 which is adjustable to direct material issuing from the hopper compartment to any angularly located portion of its associated distributor disk 16.

The front and rear walls of the hopper 6 are provided with bearing brackets 27 adapted to support the longitudinally extending auger shafts 28 which are positioned in the lower portion of each of the compartments of the hopper and directly over the outlet openings 21. The rear ends of the outer shafts 28 are provided with pulleys 29 belt driven from the pulley 30 on the jack shaft 31. The jack shaft 31 extends through the hopper underneath the sloping partition and is provided at its forward end with a driving pulley 32 connected to the drive shaft 10 by the belt 33.

The feed augers 34 are identical so only one will be described. The shaft 28 is provided with four or more radially extending pins 35 to which individual turns of a rearwardly feeding spiral rod 36 and a forwardly feeding spiral rod 37 are secured as by welding. Spaced between the forwardly and rearwardly directed spiral rods are center pins 38 arranged to be rotated with the shaft 28 partially into and across the opening 21 in the bottom of the hopper. The center pins 38 will thus break up any clods which may tend to clog the openings 21.

The spreader is extremely simple to operate and effective in its distribution of the material being spread. The feed augers 34 function at all times when the spreader is operating to provide a constant even flow of material to the delivery spouts 26. The rate of flow of the material to the spouts is readily controlled by operation of the valve handles 24 and by pre-setting the stop bolts 25 the operator can drive from a loading point to the area which is to be covered and start distribution of the material in the desired proportions by merely pushing the valve levers against the stop bolts 25. This is particularly convenient when the spreader is being used to spread a mixture of seed and fertilizer in which a relatively small amount of seed will be delivered from one side of the hopper while a relatively large amount of fertilizer is being delivered from the other side of the hopper.

The actual distribution or spreading of the material is controlled by angular adjustment of the delivery spouts 26 and tilting of the distribution disks 16 as described in my above mentioned co-pending application. Tilting adjustment of the distributor disks is facilitated by the simple mounting of the U-shaped brackets 14 on the bolts 13. The disks can be tilted forwardly or rearwardly from a horizontal position and angular adjustment of the delivery spouts will determine in which direction the material being spread will be thrown from the distributor disk. In addition, the direction of rotation of the two disks can be reversed by twisting the driving belts 19. The threaded portions on the bolts 13 are long enough to permit lateral adjustment of the U-shaped brackets 14 to accommodate variations in length of the belts due to twisting.

We have thus described a highly efficient form of spreader which is relatively inexpensive to manufacture and assemble.

Having thus described our invention, what we claim as new and desire to secure by Letters Patent is:

1. A spreading device for distributing finely divided material comprising a supporting frame, a pair of distributor disks rotatably and longitudinally tiltably mounted at each side of said frame, a hopper supported upon said frame and extending over each of said disks, the bottom of said hopper being divided into transversely spaced and downwardly converging discharge chambers, a valved opening in the bottom of each of said chambers and located generally over the centers of said disks, rotatably adjustable spouts positioned between said openings and said disks, longitudinally extending auger shafts positioned near the bottom of each of said chambers and having driving wheels on the rear ends thereof, forwardly and rearwardly pitched feed augers carried by each of said shafts, said augers consisting of spirally wound bar-like members spaced radially from said auger shafts, a clod breaking pin projecting from each of said auger shafts between said forwardly and rearwardly pitched augers and over said openings, and means for concurrently driving said auger shafts and said distributor disks.

2. A spreading device for distributing finely divided material comprising a supporting frame, a pair of distributor disks rotatably and longitudinally tiltably mounted at each side of said frame, a hopper supported upon said frame and extending over each of said disks, the bottom of said hopper being divided into transversely spaced and downwardly converging discharge chambers, a valved opening in the bittom of each of said chambers and located generally over the centers of said disks, a longitudinally extending auger shaft positioned near the bottom of each of said chambers and having driving wheels on the rear ends thereof, forwardly and rearwardly pitched feed augers carried by each of said shafts, said augers consisting of spirally wound bar-like members spaced radially from said auger shafts, a clod breaking pin projecting from each of said auger shafts between said forwardly and rearwardly pitched augers and over said openings, and means for concurrently driving said auger shafts and said distributor disks.

3. In combination with a spreader having a hopper with a discharge opening in the bottom thereof, a feed auger comprising a rotatable shaft spaced above said opening, radially projecting pins secured to said shaft at longitudinally spaced intervals therealong, a rearwardly pitched spiral feed member secured to two of said pins, a forwardly pitched spiral feed member secured between two others of said pins and to the rear of said first member, said spiral members consisting of bar-like elements spaced from said auger shaft, and a clod breaking pin projecting from said shaft between said spiral members to rotate with said shaft into and across said opening.

4. A spreader for attachment to a tractor comprising a pair of longitudinally extending beams adapted to be secured to the tractor and having downwardly extending U-shaped portions toward their rear ends, a generally rectangular horizontal supporting frame secured to said beams and projecting beyond each side thereof, a hopper supported by and above said frame and divided into laterally disposed chambers each having a discharge opening in the bottom thereof, feed augers positioned near the bottoms of said chambers and having oppositely pitched spiral feed rods arranged to urge material in the hoppers toward said openings, transversely extending threated bolts projecting inwardly from the sides of said frame and opposite said U-shaped portions in said beams, yoke-like brackets rotatably adjustably mounted on said bolts and having their open ends positioned within the U-shaped portion of said beams, distributor shafts mounted on the arms of said yokes, distributor disks carried on said shafts and located under said openings in said openings in said chambers, angularly adjustable spouts interposed between said openings and said disks, and shaft means carried on said frame for driving said distributor shafts and augers.

5. A spreader for attachment to a tractor comprising a pair of longitudinally extending beams adapted to be secured to the tractor, a generally rectangular horizontal supporting frame supported by said beams and projecting beyond each side thereof, a hopper supported by and above said frame and having transversely spaced discharge openings in the bottom thereof, feed augers positioned near the bottom of said hopper and having oppositely pitched spiral feed rods arranged to urge material in the hopper toward said openings, transversely extending threaded bolts projecting inwardly from the sides of said frame, brackets rotatably adjustably mounted on said bolts, distributor shafts mounted on said brackets and transversely of said bolts, distributor disks carried on said shafts and located under said openings in said hopper, angularly adjustable spouts interposed between said openings and said disks, and shaft means carried on said frame for driving said distributor shafts and augers.

6. Means for tiltably mounting a distributor shaft on a spreader machine having a hopper mounted on a frame and discharging to a distributor disk on the shaft comprising, a threaded element extending transversely of said frame and supported thereby, a bracket rotatably mounted on said threaded element, nuts for clamping said bracket in various angularly and longitudinally adjusted positions on said threaded element, and bearings on said bracket for supporting said shaft in a plane transverse to said threaded element.

HENRY SKIBBE.
HAROLD A. SKIBBE.

REFERENCES CITED

The following references are of record in the file of this patent:

UNITED STATES PATENTS

| Number | Name | Date |
| --- | --- | --- |
| 365,519 | Hotham | June 28, 1887 |
| 1,293,281 | Wills | Feb. 4, 1919 |
| 1,767,017 | Scheckler | June 24, 1930 |
| 1,811,324 | Lockard | June 23, 1931 |
| 2,099,369 | Lutz | Nov. 16, 1937 |
| 2,162,689 | Mayfield | June 20, 1939 |
| 2,323,262 | Warren | June 29, 1943 |
| 2,369,755 | Rosselot | Feb. 20, 1945 |